United States Patent
Forder (10) Patent No.: US 6,895,559 B2
(45) Date of Patent: May 17, 2005

(54) AUTO-COMPLETION ALGORITHM FOR DIALING TELEPHONE NUMBERS

(75) Inventor: David A. Forder, Buford, GA (US)

(73) Assignee: Matsushita Mobile Communications Development Corporation of U.S.A., Suwanee, GA (US)

(*) Notice: Subject to any disclaimer, the term of this patent is extended or adjusted under 35 U.S.C. 154(b) by 253 days.

(21) Appl. No.: 09/736,765

(22) Filed: Dec. 12, 2000

(65) Prior Publication Data

US 2004/0070634 A1 Apr. 15, 2004

(51) Int. Cl.$^7$ ................................................ G06F 3/00
(52) U.S. Cl. ........................ 715/780; 715/864; 715/968
(58) Field of Search ................................ 345/780, 764, 345/864, 169, 968, 975, 708, 705, 709; 707/3, 6, 104.1

(56) References Cited

U.S. PATENT DOCUMENTS

| | | | | |
|---|---|---|---|---|
| 4,862,390 A | * | 8/1989 | Weiner | ........................ 345/822 |
| 5,708,804 A | * | 1/1998 | Goodwin et al. | ............... 707/3 |
| 5,805,164 A | * | 9/1998 | Blum et al. | .................. 345/808 |
| 5,864,340 A | * | 1/1999 | Betram et al. | ............... 345/780 |
| 5,977,969 A | * | 11/1999 | DiAngelo | .................... 345/780 |

\* cited by examiner

*Primary Examiner*—Raymond J. Bayerl
*Assistant Examiner*—Kieu D. Vu
(74) *Attorney, Agent, or Firm*—Needle & Rosenberg, P.C.

(57) ABSTRACT

A method of dialing is disclosed which attempts to "guess" as to which number the user is attempting to dial into a communication device, such as a cellular telephone. From the idle mode (200), the user punches the digits of the number (201), and a list of possible candidate numbers is created (203), (204), or (205). This list of candidate numbers is displayed to the user as candidates are added to the list (206), or not displayed if there were no acceptable candidate numbers (207). If one of the candidate numbers is one of the numbers displayed, the user can select the number in order to have that number dialed. Otherwise, if the number cannot be predicted before completion of entering the number, then the number is entered into the outgoing call log for possible suggestion later if the user dials the number again.

28 Claims, 8 Drawing Sheets

AUTO-COMPLETION ALGORITHM FOR DIALING TELEPHONE NUMBERS

FIELD OF THE INVENTION

This invention relates generally to the field of communication technology, and in particular, to methods of improving the method of entering a number on a communication device by completing a partially entered number with a matching number from a stored telephone number.

BACKGROUND OF THE INVENTION

I. Survey of Need

People are intensively relying on various communication technologies to communicate each day. Often, the numbers dialed are a small group of the same numbers, i.e., relatives, friends, pizza delivery, or workplace. People also use these various communication technologies, such as cellular telephones, while in a rush, at work, or in the car. Furthermore, the numbers frequently dialed usually are a finite list of numbers. Because of the situations in which these technologies are used, and the importance such technologies have in everyday life, it is desirable to improve the efficiency and ease of entering numbers into such communication devices. One improvement in the art is the provision of a dialing assistant to facilitate the automatic completion of partially dialed numbers. Decreasing the time one spends dialing a number on a cellular telephone, for example, decreases the time the driver's eyes are focused on the telephone and not on the road. Thus, there is a need to improve upon the safety as well as the efficiency of these communication technologies.

II. Current Techniques of Auto-Completion

Data processing systems can take on many forms ranging from highly formatted, custom or specialized database programs to a more generic, user-defined database. Auto-completion techniques can be seen within this spectrum of data processing systems. An example of a more generic database utilizing an automatic data entry completion algorithm is the computer spreadsheet program, Microsoft Excel, marketed by Microsoft Corporation. Another example can be seen in Quattro Pro, another spreadsheet program marketed by Corel. These applications however, do not achieve the objective of suggesting telephone numbers.

Automatic completion algorithms generally refer to the technique of comparing a partially entered data item to a list of possible completed data items to find a suggestion for completing the partially entered data item. Automatic completion algorithms improve the method of entering data by increasing the speed and integrity of each data entry. For example, a user is only required to enter enough data to allow the system to suggest the completed version of what the user is in the method of entering. This results in an increase in speed by reducing the number of required key strokes.

III. State of Art Auto-Completion Algorithms are not Adequate

Current auto-completion algorithms do not provide for suggesting completions for telephone numbers being dialed with a communication device. Implementing an automatic completion feature for a communication device presents several complicated issues. The implementation must be able to: 1) differentiate between accessing an address book entry, versus directly dialing a telephone number; 2) find appropriate candidates to suggest as completions based on numbers which have been entered; and 3) process long distance numbers and special dialing situations.

In view of the foregoing, an auto-completion feature for a communication device must be able to accommodate long distance numbers, local numbers, and address book entries. There is a need for this auto-completion feature because such would increase the efficiency of communication devices, increase the integrity of the numbers entered into the communication device and improve the safety of using such devices.

SUMMARY OF THE INVENTION

The present invention satisfies the above needs by providing a system and method to automatically suggest a candidate completion for a partially entered telephone number for use on a communication device and allowing a suggested candidate to be dialed. As each digit of a number is entered, several heuristics are used to "guess" appropriate candidates. If one of the candidates is the desired number, then the user can select the correct candidate. The selected candidate can then be dialed by the communication device.

Generally, the present invention simplifies the dialing process for a communication device by providing suggested completions of partially entered numbers. The operation of the present invention includes generating a candidate list from telephone book entries and/or the call history list of the communication device. More specifically, the call history may include the outgoing call history, the incoming call history, missed call history, and any other supported telephone number sources.

When an item is being entered into the communication device, the call history and telephone book entries are examined to determine if there is a match with the currently entered digits. If one or more matches are found, the matches are presented as candidate matches. A user utilizing a communication device which incorporates the present invention can then select one of the presented candidate matches. These and other aspects, features, and advantages of the present invention will be more clearly understood and appreciated from a review of the following detailed description of the present invention and possible embodiments thereof, and by reference to the appended drawings and claims.

DETAILED DESCRIPTION OF THE PREFERRED EMBODIMENT

Referring now to the figures in which like numerals refer to like elements throughout the several views, various embodiments and aspects of the present invention are described. Although the present invention is described as embodied within a telephone device, such as a cellular telephone, those skilled in the art will appreciate that the present invention may be used in conjunction with a telephone, computer, or any other communication device which utilizes telephone numbers.

Figure 1:
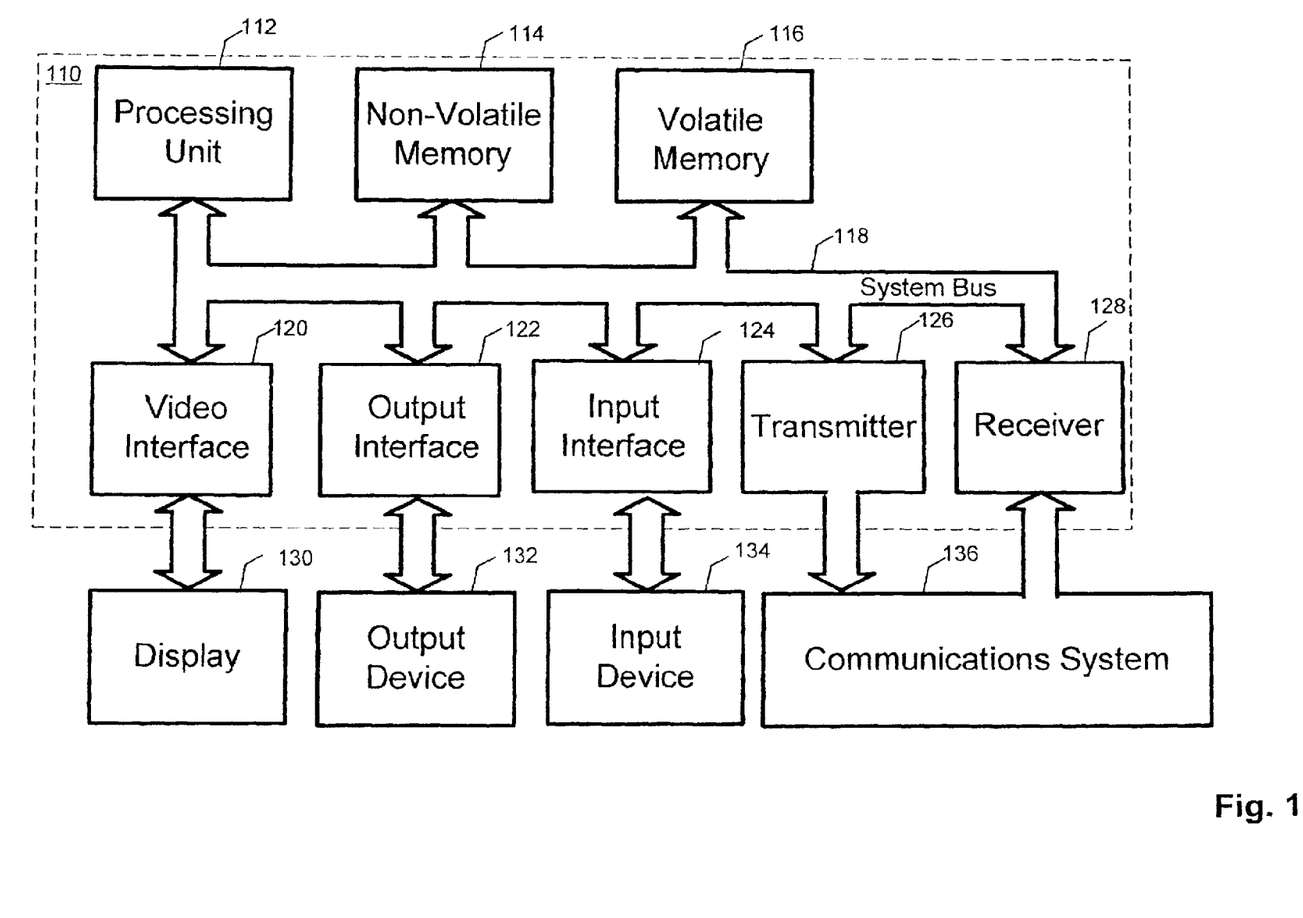
FIG. 1 is a system diagram that illustrates an exemplary environment suitable for implementing various embodiments of the present invention.

FIG. 1 is a system diagram that illustrates an exemplary environment suitable for implementing various embodiments of the present invention. FIG. 1 and the following discussion provide a general overview of a platform onto which the invention may be integrated or implemented. Although in the context of the exemplary environment the invention will be described as consisting of instructions within a software program being executed by a processing unit, those skilled in the art will understand that portions of the invention, or the entire invention itself may also be implemented by using hardware components, state machines, or a combination of any of these techniques.

In addition, a software program implementing an embodiment of the invention may run as a stand-alone program or as a software module, routine, or function call, operating in conjunction with an operating system, another program, system call, interrupt routine, library routine, or the like. The term program module will be used to refer to software programs, routines, functions, macros, data, data structures, or any set of machine readable instructions or object code, or software instructions that can be compiled into such, and executed by a processing unit.

Those skilled in the art will appreciate that the system illustrated in FIG. 1 may take on many forms and may be directed towards performing a variety of functions. Examples of such forms and functions include mainframe computers, mini computers, servers, work stations, personal computers, hand-held devices such a personal data assistants and calculators, consumer electronics, note-book computers, lap-top computers, and a variety of other applications, each of which may serve as an exemplary environment for embodiments of the present invention. The invention may also be practiced in a distributed computing environment where tasks are performed by remote processing devices that are linked through a communications network. In a distributed computing environment, program modules may be located in both local and remote memory storage devices.

The exemplary system illustrated in FIG. 1 includes a computing device 110 that is made up of various components including, but not limited to a processing unit 112, non-volatile memory 114, volatile memory 116, and a system bus 118 that couples the non-volatile memory 114 and volatile memory 116 to the processing unit 112. The non-volatile memory 114 may include a variety of memory types including, but not limited to, read only memory (ROM), electronically erasable read only memory (EEROM), electronically erasable and programmable read only memory (EEPROM), electronically programmable read only memory (EPROM), electronically alterable read only memory (EAROM), and battery backed random access memory (RAM). The non-volatile memory 114 provides storage for power on and reset routines (bootstrap routines) that are invoked upon applying power or resetting the computing device 110. In some configurations the non-volatile memory 114 provides the basic input/output system (BIOS) routines that are utilized to perform the transfer of information between elements within the various components of the computing device 110.

The volatile memory 116 may include, but is not limited to, a variety of memory types and devices including, but not limited to, random access memory (RAM), dynamic random access memory (DRAM), FLASH memory, EEROM, bubble memory, registers, or the like. The volatile memory 116 provides temporary storage for routines, modules, functions, macros, data etc. that are being or may be executed by, or are being accessed or modified by the processing unit 112. In general, the distinction between non-volatile memory 114 and volatile memory 116 is that when power is removed from the computing device 110 and then reapplied, the contents of the non-volatile memory 114 remain intact, whereas the contents of the volatile memory 116 are lost, corrupted, or erased.

The computing device 110 may access one or more external display devices 130 such as a CRT monitor, LCD panel, LED panel, electro-luminescent panel, or other display device, for the purpose of providing information or computing results to a user. The processing unit 112 interfaces to each display device 130 through a video interface 120 coupled to the processing unit 112 over system bus 118.

The computing device 110 may receive input or commands from one or more input devices 134 such as a keyboard, pointing device, mouse, modem, RF or infrared receiver, microphone, joystick, track ball, light pen, game pad, scanner, camera, or the like. The processing unit 112 interfaces to each input device 134 through an input interface 124 coupled to the processing unit 112 over system bus 118. The input interface may include one or more of a variety of interfaces, including but not limited to, an RS-232 serial port interface or other serial port interface, a parallel port interface, a universal serial bus (USB), an optical interface such as infrared or IRDA, an RF or wireless interface such as Bluetooth, or other interface.

The computing device 110 may send output information, in addition to the display 130, to one or more output devices 132 such as a speaker, modem, printer, plotter, facsimile machine, RF or infrared transmitter, or any other of a variety of devices that can be controlled by the computing device 110. The processing unit 112 interfaces to each output device 132 through an output interface 122 coupled to the processing unit 112 over system bus 118. The output interface may include one or more of a variety of interfaces, including but not limited to, an RS-232 serial port interface or other serial port interface, a parallel port interface, a universal serial bus (USB), an optical interface such as infrared or IRDA, an RF or wireless interface such as Bluetooth, or other interface.

The computing device 110 may communicate information to a communications system 136. This communication system receives information from computing device 110 from the transmitter 126. The computing device 110 may also receive information from communications system 136 by the receiver 128. The processing unit 112 interfaces with the communications system 136 through the transceiver 126 and the receiver 128, which are both coupled to the processing unit 112 over system bus 118.

It will be appreciated that program modules implementing various embodiments of the present invention may be stored in the non-volatile memory 114 or the volatile memory 116. The program modules may include an operating system, application programs, other program modules, and program data. The processing unit 112 may access various portions of the program modules in response to the various instructions contained therein, as well as under the direction of events occurring or being received over the input interface 124.

Figure 2:
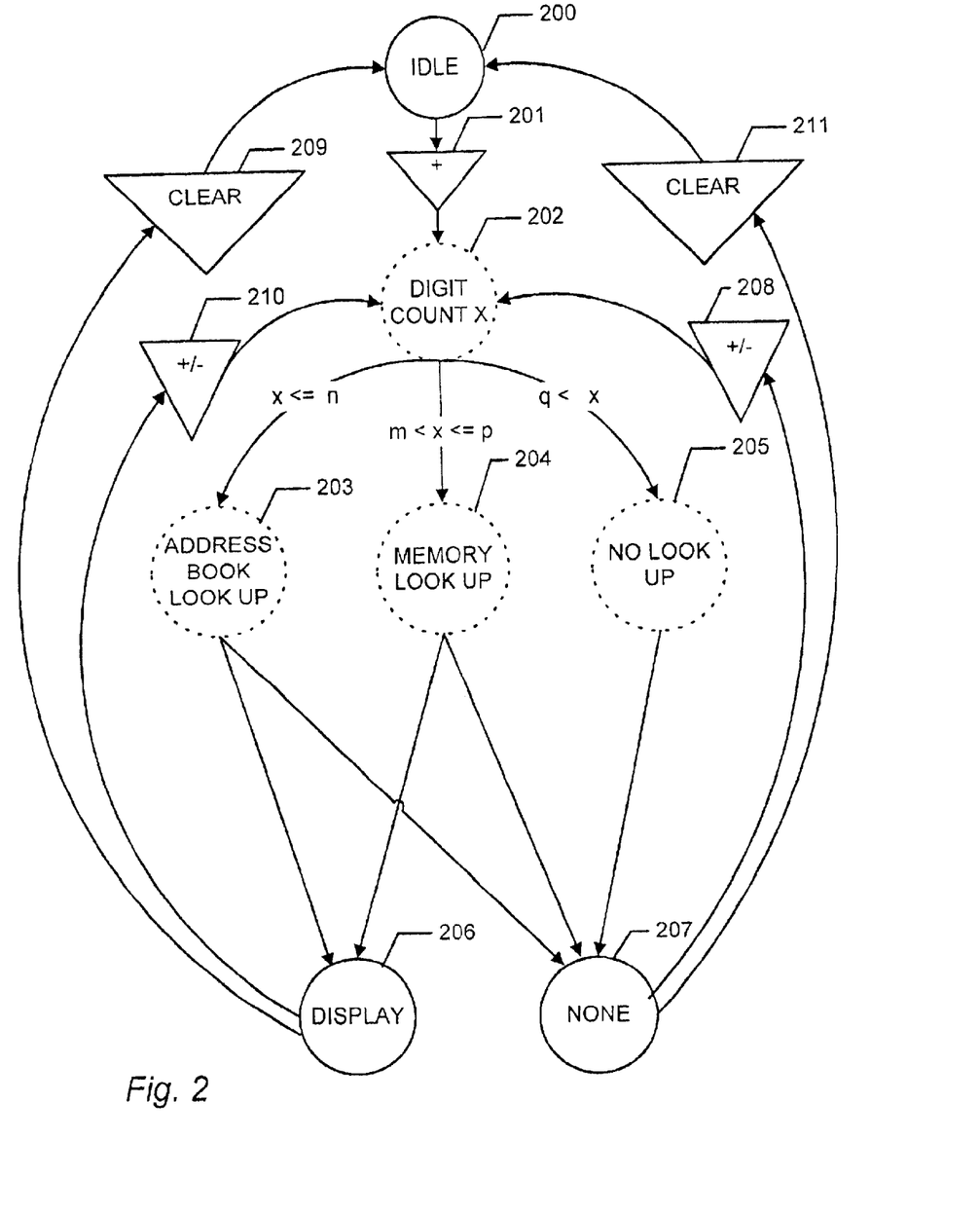
FIG. 2 is a state diagram which illustrates the various states of the auto-completion algorithm.

FIG. 2 is a state diagram which illustrates the various states of the auto-completion algorithm. The states in dotted lines in FIG. 2, such as 202, 203, 204, and 205, represent transitional states in the algorithm, which are exited at the conclusion of executing a program module. The states in solid lines represent steady states, which are exited in response to a user action. The triangular shaped states, such as 201 and 208–211, represent user actions and invoke a transfer out of a steady state.

In an exemplary embodiment of the present invention, the value of n is set to 2. In this embodiment, the first two digits entered into the communication device are viewed as an address identifying number stored within the address book. For example, if the user enters the number "4," the algorithm will operate to retrieve the telephone numbers stored at address location 4 and provide them as suggested completions. If the user then enters the number "2," the partially entered number is then "42." The algorithm will operate to retrieve the telephone numbers stored at address location 42 and provide them as suggested completions. This automatic assumption, that the user is attempting to access an address book entry, is only applicable to the first two digits the user enters into the communication device. Thus, in the illustrated embodiment with these first two numbers, the system does not look in the memory at all for candidates to suggest to the user.

It should be understood that the value of n is not limited to any particular number; however, in typical embodiments, the value of n will be between 1 and 4. In addition, although the present invention describes entering the address book look-up state 203, memory look-up state 204, and the no look-up state 205 as mutually exclusive states, it should be understood that depending on the values assigned to n, m, p, and q, that these states may not be mutually exclusive. Thus, if n=3 and m=3, then a three-digit entry will result in the entry of the address book look-up state 203 to retrieve numbers based on the address entry and the memory look-up state 204 to retrieve numbers that match the partially entered numbers.

It should be understood that although the present invention is described as accessing numbers stored within the memory of the device embodying the present invention, the stored numbers could also reside in an external device. These numbers could then be accessed using any type of wired, wireless or optical interface.

Initially, in an exemplary embodiment which would comprise a cellular telephone, the first state of the auto-completion algorithm is the idle state 200. At this state, the cellular telephone would have no numbers on the display, and the user has not entered any digits into the telephone. The idle state 200 is exited when the user begins to enter a telephone number into the communication device 201 and the digit count state 202 is entered. The digit count state 202 counts the number of digits that have been entered by the user ("x").

Depending on the value of x, one of three possible states will be entered, each of which contains its own set of heuristics which are applied to find numerical candidates to suggest to the user. Address book look-up state 203 is entered when x is less than or equal to a variable n, with n being the numerical length of the address used to identify book entries in the communication device address book. Memory look-up state 204 is entered when x is greater than m, which is the minimum number of digits necessary for the algorithm to suggest a possible telephone number, yet is less than or equal to p, which is the maximum length of telephone numbers stored in the memory. The no look-up state 205 is entered when x is greater than the variable q, with q being the variable beyond which suggestions can be retrieved from the memory of the communication device. The no lookup state 205 is entered when there are no possible candidates to suggest, and leads to the no display state.

The use of the five variables x, n, m, p, and q in the algorithm allows the auto-complete feature to accommodate various sizes and configurations of address books, which may utilize addresses with different lengths from the preferred embodiment (which uses 2 digit long addresses in the address book). Furthermore, the use of these variables enable the algorithm to adapt with ease to international situations which may have telephone numbers at the same or shorter length as the numerical length of the address book locations.

After completion of either the address book look-up 203, memory look-up 204, or no look-up 205 processes, the algorithm moves to one of two states: display state 206 or no display state 207. If a candidate to suggest for the auto-completion is identified, the algorithm moves to the display state 206. If a candidate for suggestion for the auto-completion is not identified, the algorithm moves to the no display state 207 rather than the display state 206.

In the display state 206, at least one candidate to suggest to the user has been identified. The user has the option to enter additional digits 210 into, or delete a digit 210 already entered into, the communication device, or clear the partially entered number from the device 209. If the user enters or deletes a digit 210, the digit count state 202 is re-entered to determine the value of x. If the user clears the partially entered number from the communication device 209, then the idle state 200 is re-entered.

In the no display state 207, no candidates to suggest to the user have been identified. The user at this time has the option to enter additional digits into or delete a digit already entered into the communication device 208. The user also has the option to clear the partially entered number from the communication device 211, which will result in a transition to the idle state 200. Thus, depending on the value of x, the algorithm moves through the qualifications for 203, 204, and 205 to see if the value of x invokes any of these processes. The cycle continues until one of the processes is invoked. If the user clears the entry of digits from the communication device 211 then the algorithm moves to the idle state 200.

Figure 3:
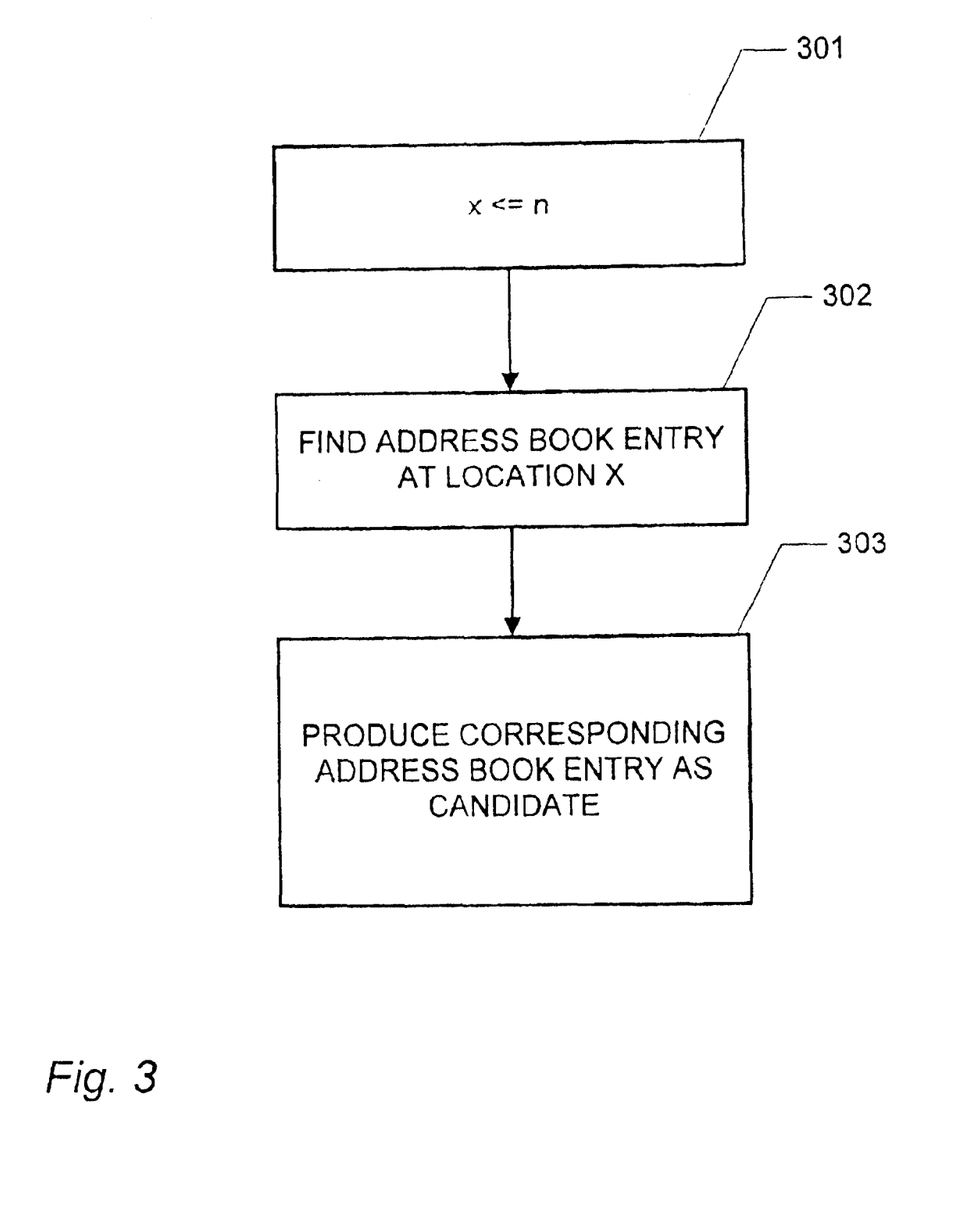
FIG. 3 is a flow diagram illustrating address book look-up method of the algorithm.

FIG. 3 is a flow diagram illustrating the processing performed in the address book look-up state 203. If the amount of digits the user has entered, x, is less than or equal to n, as in state 301, then the number the user is dialing could potentially be an address for an address book entry. The algorithm operates to locate the address book entry at the location represented by the value of x in the address book (step 302). The one or more numbers stored at this location in the address book is displayed to the user as the suggested candidates (step 303).

Figure 4:
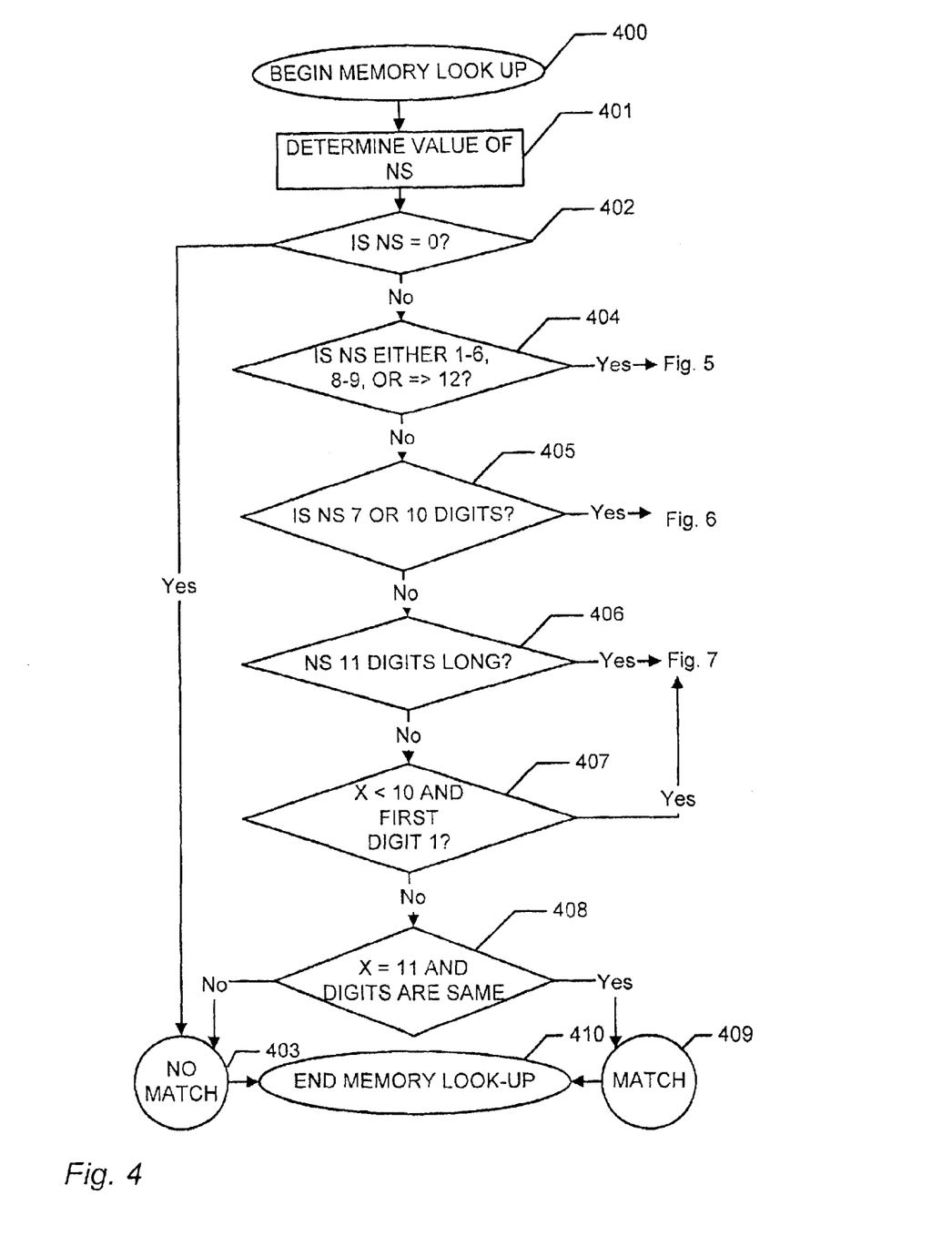
FIG. 4 is a flow diagram illustrating the memory look-up method of the algorithm.

FIG. 4 is a flow diagram illustrating the processing performed in the memory lookup state 204. Throughout FIGS. 4–7, the variable x represents the number of digits entered by the user, and NS represents the number of digits in a stored number, not including pause information. Pause information is a symbol entered into the communication device, such as a "*," which instructs the communication device to briefly pause at that particular location in the numerical entry during the dialing process.

After the memory look-up process begins 400, the amount of digits of each stored number is ascertained at step 401. If the stored number does not have any digits at all 402, then it is deemed "no match" at 403 because a number cannot be a match if there are no digits in the stored number. If the stored number has 1–6, 8–9, or 12 or more digits 404, then the algorithm moves to FIG. 5. If the search for potential candidates finds a number which is 7 or 10 digits long 405, then the algorithm leads to FIG. 6. If the stored number encountered during the search is 11 digits long 406, then the stored number is a long distance number, which leads to FIG. 7. If the number of digits entered by the user is less than 10, and the first digit of the entered number is a 1, then the user may be attempting to dial a long distance number 407, which also leads to FIG. 7. If the digits are not the same, then the last possibility is that the number of digits entered by the user is 11 digits, and all 11 digits of the stored number and the number entered by the user are the same digits 408. In this case, the number is deemed a match 409. If not, the number is not a match 403. Once the number is determined to be a match or not a match, the memory look-up process ends 410.

Figure 5:
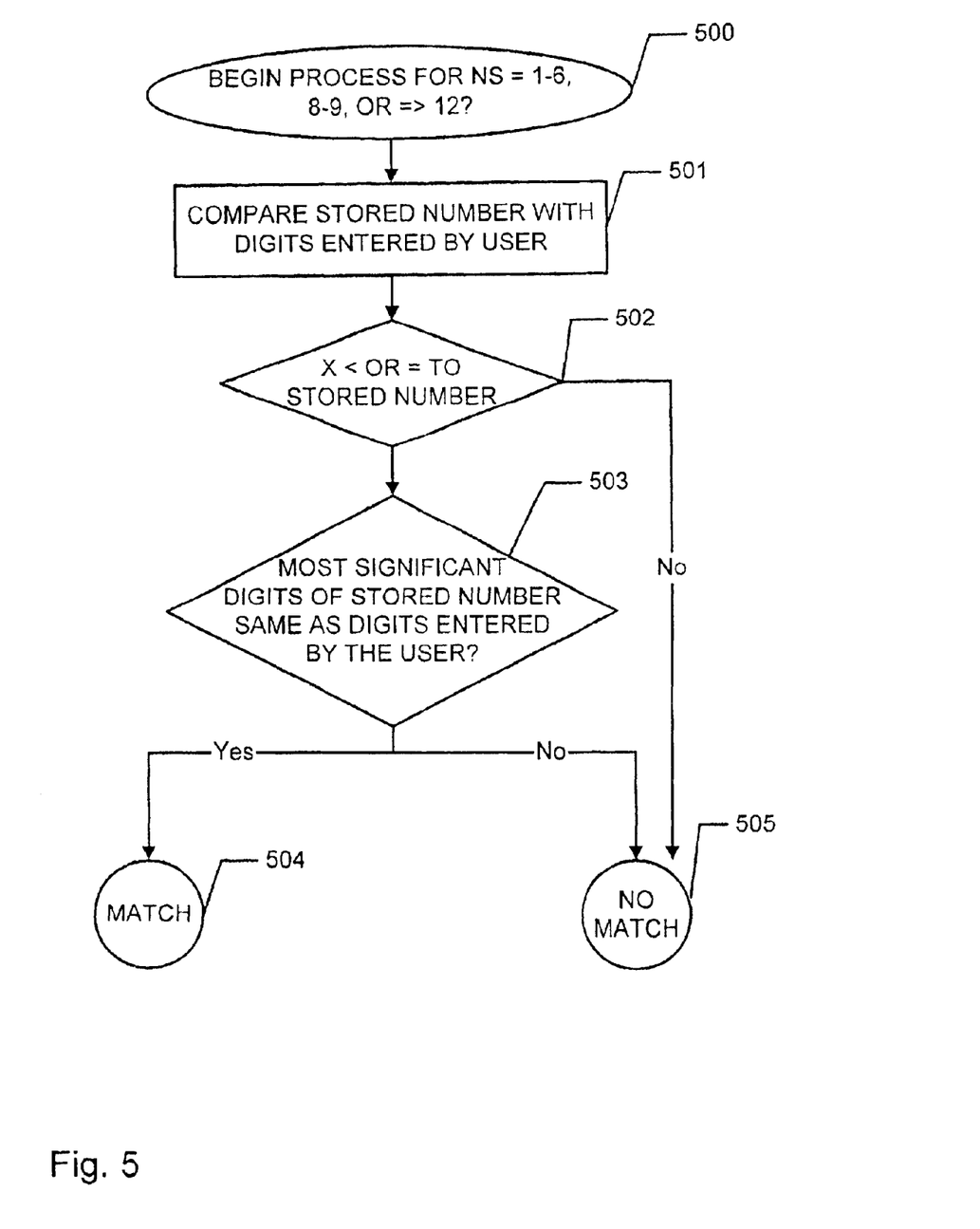
FIG. 5 is a flow diagram illustrating the operation of the memory look-up method when NS equals 1–6, 8–9, or less than/equal to 12.

FIG. 5 is a flow diagram illustrating the operation of the memory look-up method when NS=1–6, 8–9, or less than or equal to 12. In FIG. 5, after the process begins 500, the stored number is compared with the digits entered by the user 501. If the amount of digits entered by the user x is less than or equal to the number of digits in the stored number 502, then the stored number is a possible match. Thus, the method next compares the most significant digits of the stored number with the digits entered by the user. If the numbers are the same, the stored number could be the one the user is attempting to dial, and the number is a match 504. If the numbers are not similar, the number is not a match 505.

Figure 6:
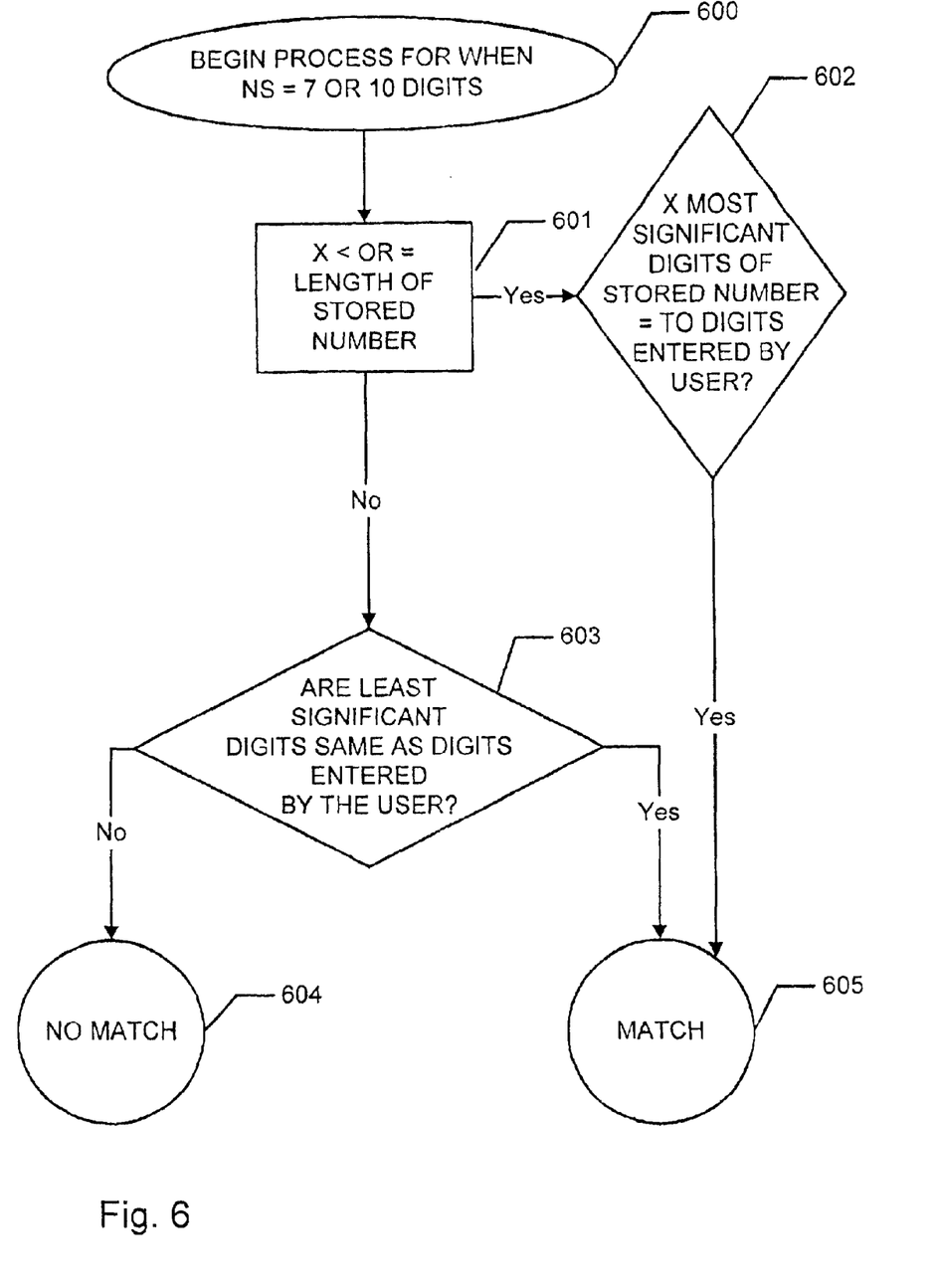
FIG. 6 is a flow diagram illustrating the operation of the memory look-up method when NS=7 or 10.

FIG. 6 is a flow diagram illustrating the operation of the memory look-up method when NS=7 or 10. In FIG. 6, after the process begins 600, if the number of digits entered by the user x is less than or equal to the length of the stored number 601, then the stored number could possibly be a match. Thus, if the x most significant digits of the stored number are equal to the digits that the user has entered into the communication device 602, then the stored number may be the number the user is attempting to dial, and is deemed a match 605. If the x most significant digits are not equal to what the user has entered, the method next compares the least significant digits with the digits entered by the user 603. If the least significant digits are the same, then the number is deemed a match 605. If not, the number is not a match 604.

Figure 7:
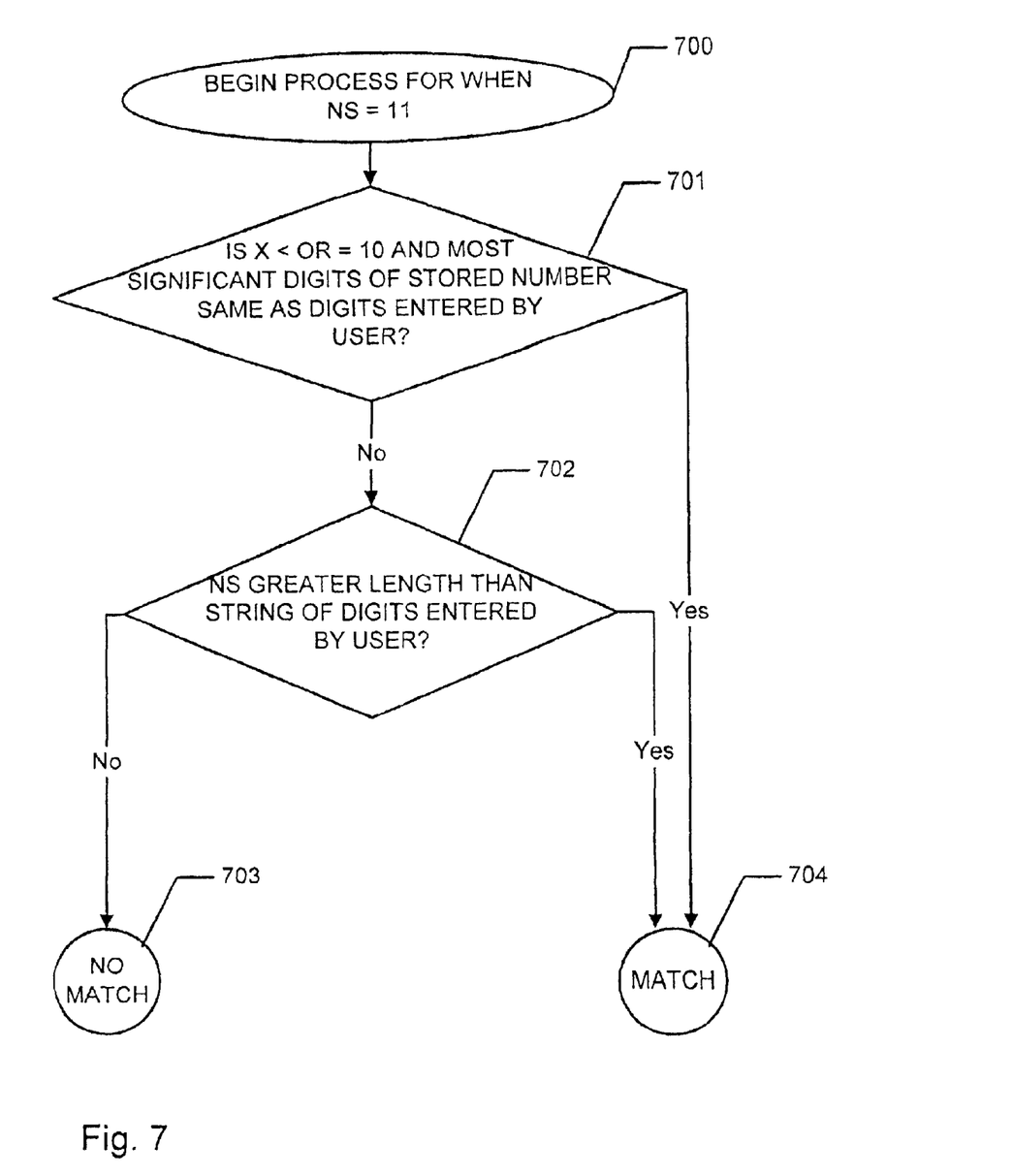
FIG. 7 is a flow diagram illustrating the operation of the memory look-up method when NS equals 11.

FIG. 7 is a flow diagram illustrating the operation of the memory look-up method when NS=11. In FIG. 7, after the process begins 700, the first inquiry is to determine whether the amount of digits entered x is less than or equal to 10, and if the x most significant digits of the stored number are the same as the digits entered by the user into the communication device 701. If x is less than or equal to 10 and the x most significant digits match the entered number, then the stored number is a match. If not, then if the stored number NS is shorter in length than the string of digits entered by the user 702, then the number cannot be a match because the stored number is shorter in length and thus is deemed "no match" 703.

In this case, the search does not need to be limited to stored numbers that begin with a 1. Thus, the most significant digits of the stored number are compared with the entered number and with the entered number excluding the leading "1" digit. This allows for stored numbers that include or exclude the leading 1 to be considered as possible matches. If these digits in either comparison technique are the same, then the number is deemed a match.

Figure 8:
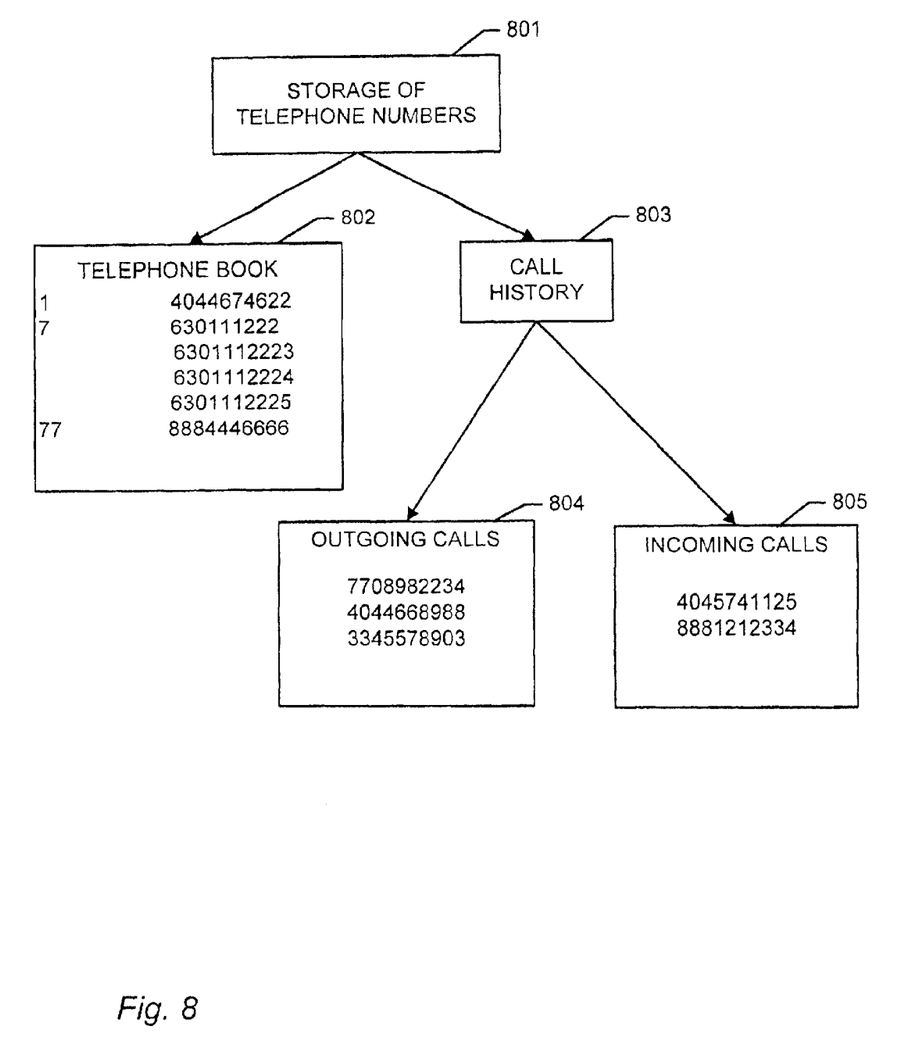
FIG. 8 is a memory map diagram illustrating an exemplary memory scheme for storing the telephone numbers.

FIG. 8 is a memory map diagram illustrating an exemplary memory scheme for storing telephone numbers. The domain of numbers that are searched for candidates 801 include an address book 802 and call history 803. The call history 803 may include two components: an outgoing calls list 804 and an incoming calls list 805. The outgoing calls list 804 can be arranged with the most recent at the top of the list. The incoming calls list 805 can be further split into answered calls and missed calls.

The operation of the present invention can best be understood by examining a few examples. For the example provided, the following assumptions are being made: n=2, m=3, p=11, q=11 and the memory configuration illustrated in FIG. 8 defines the memory content. If the user enters a 7, the address look-up state 203 is entered and the address look-up processing in FIG. 3 is performed. The address look-up process will result in identifying "630111222," "6301112223," "6301112224," and "6301112225," the numbers stored at address book location 7, as candidate completions. Once the candidate completions are identified, the display state 206 is entered and the candidate completions are displayed.

If the user enters another "7," then the partially entered number is "77." Again, since the number of entered digits is less than or equal to 2, the address look-up state is entered. The address look-up process results in identifying the number "8884446666" (address book location "77") as a candidate completion. Once the candidate completions are identified, the display state 206 is entered and the candidate completions are displayed.

If the user enters a "0," then the partially entered numbers are "770." This is a three digit long number, and thus the memory look-up state will be entered. The memory look-up process will then search the call history 803, where outgoing calls 804 and incoming calls 805 are searched for candidates. The only candidate with matching digits in the call history 803 is "7708982234" in the outgoing calls log 804. The display state 206 will then be entered and the candidate completion will be displayed. If the user does not select "7708982234," then the number which was ultimately entered will be stored in the outgoing calls log 804, and will be subject to the next candidate search.

The algorithm of the present invention can also accommodate systems with larger address book capabilities. For example, if a system provides for an address book with 3 digit addresses, the algorithm could simply provide for automatic suggestion of the appropriate address book entry for less than 4 digits instead of less than 3 as shown in FIG. 3. The same could be said for any size address book, as long as the algorithm is programmed to automatically suggest the appropriate address book entry for less than x length numbers, with x being 1+y, and y being the length of the address book entry addresses.

Overall, this invention will help increase the dialing efficiency on communication devices by reducing the amount of time to dial the number. Additionally, the invention will lessen the need for writing down numbers to be dialed if the user can remember the first few digits of the number. This invention will be useful because of the increased efficiency and increased data integrity it will provide for such communication devices.

What is claimed is:

1. A method of providing suggested completions for a numeric data entry, comprising the steps of:
   a) receiving a numeric data entry;
   b) applying a set of rules to the numeric data entry to identify a candidate match from a list of possible matches, the set of rules implementing a plurality of variables, the plurality of variables defining a plurality of search states from which candidate match is selected, at least one of the plurality of search states chosen based on a number of digits in the numeric data entry, the set of rules using the numeric data entry to choose the candidate match from among an address book entry, a phone number in a call history, and non-standard dialing instructions; and c) receiving a response signal associated with the candidate match.

2. The method of claim 1, wherein the numeric data entry and the list of possible matches are telephone numbers.

3. The method of claim 1, wherein the candidate match is provided to a user interface, and the response signal is received from the interface further comprising the steps of:
   d) if the said response signal is an acceptance of the candidate match, replacing said numeric data entry with the candidate match;
   e) if said response modifies the numeric data entry, continue at step (b) with the modified numeric data entry; and
   f) if said response is a rejection of the candidate match, displaying the numeric data entry.

4. The method of claim 1, wherein the numeric data entry has n digits or less, and the applying a set of rules step comprises the step of retrieving contents of an address book location identified by the numeric data entry as a candidate match.

5. The method of claim 1, wherein the numeric data entry has n digits or less, and the applying a set of rules step comprises the step of retrieving all numbers associated with the address book location identified by the numeric data entry as a candidate match.

6. The method of claim 1, wherein a number of digits in the numeric data entry
   entered by the user is equal to x digits long, where x is greater than m but less than p, and the applying a set of rules step comprises the steps of:
   searching through a memory storage device which contains one or more numbers,
   identifying stored numbers that match said numeric data entry as a candidate match.

7. The method of claim 6, wherein the identifying step comprises comparing the x most significant digits of the stored number in memory to the numeric data entry.

8. The method of claim 1, wherein the numeric data entry entered by the user is x digits long, where x is greater than q, then no candidate matches are displayed to the user.

9. The method of claim 1, wherein a magnetic media device contains a program module to perform said method.

10. A method of providing suggested completions for a numeric data entry, comprising the steps of:
    a) receiving a numeric data entry;
    b) applying a set of rules to the numeric data entry to identify at least one candidate match from a list of possible matches, the set of rules implementing a plurality of variables, the plurality of variables defining a plurality of search states from which the at least one candidate match is selected, at least one of the plurality of search states chosen based on a number of digits in the numeric data entry, the set of rules using the numeric data entry to choose the candidate match from among an address book entry, a phone number in a call history, and non-standard dialing instructions; and
    c) receiving a response signal associated with the at least one candidate match.

11. The method of claim 10, wherein the at least one candidate match is a suggested completion to the numeric data entry, and prior to the receiving a response step, providing the at least one candidate match to a user interface.

12. The method of claim 11, wherein duplicate numbers are removed from the at least one candidate match.

13. The method of claim 10, wherein the at least one candidate match is provided to a user interface, and the response signal is received from said user interface, further comprising the steps of:
    d) if said response signal is an acceptance of one of the at least one candidate match, replacing the numeric data entry with the accepted candidate match;
    e) if the response modifies said numeric data entry continue at step (b) with the modified numeric data entry; and
    f) if the response is a rejection of at least one candidate match, displaying the numeric data entry.

14. The method of claim 10, wherein the numeric data entry entered by the user is equal to or less than n digits long, and the applying a set of rules step comprises the step of retrieving the contents of an address book location identified by the numeric data entry as a candidate match.

15. The method of claim 10, wherein the numeric data entry entered by the user is equal to or less than n digits long, and the applying a set of rules step comprises the step of retrieving all numbers associated with an address book location identified by the numeric data entry as a suggested completion.

16. The method of claim 10, wherein the numeric data entry entered by the user is equal to or less than x digits long, where x is greater than m, and less than p, and the applying a set of rules step comprises the steps of:
    searching through a memory storage device, the memory storage device containing one or more stored numbers, and
    identifying stored numbers that match said numeric data entry as a candidate match, and adding these numbers to the at least one candidate match.

17. The method of claim 16, wherein the identifying step comprises comparing the x most significant digits of the stored number to the numeric data entry.

18. The method of claim 10, wherein if a number of digits in the numeric data entry is equal to x, and x is greater than q, then no candidate match is displayed to the user.

19. An apparatus for providing auto-completions for a partially entered numeric data entry by offering candidate matches, said candidate matches being selected from telephone numbers accessible to the apparatus, the apparatus comprising:
    a) a stored telephone number memory interface for accessing a list of stored telephone numbers;
    b) a memory device for containing a program module;
    c) an input interface; and
    d) a processing unit coupled to the memory device, the stored telephone number interface and the input interface, the processing unit being operative in response to instructions of the program module to:
       i) receive a numerical data entry from the input interface; and
       ii) applying a set of rules to identify a candidate match for said numerical data entry from the list of stored telephone numbers accessed via the stored telephone number memory interface, the set of rules implementing a plurality of variables, the plurality of variables defining a plurality of search states from which the candidate match is selected, at least one of the plurality of search states chosen based on a number of digits in the numeric data entry, the set of rules using the numeric data entry to choose the candidate match from among an address book entry, a phone number in a call history, and non-standard dialing instructions.

20. The apparatus of claim 19, wherein the apparatus is a cellular telephone.

21. The apparatus of claim 19, wherein the apparatus is a computer with a modem.

22. The apparatus of claim 19, wherein the apparatus is a hand held computer.

23. The apparatus of claim 19, wherein the apparatus is a telephone.

24. The apparatus of claim 19, further comprising an output interface, wherein a candidate match is supplied to the output interface.

25. The apparatus of claim 19, wherein a response associated with the candidate match can be provided via the input interface.

26. The apparatus of claim 25, wherein if the response is an acceptance, then the numeric data entry is replaced with the candidate match.

27. The apparatus of claim 25, wherein if the response is a rejection, the numeric data entry is displayed on the user interface.

28. The apparatus of claim 25, wherein if the response is a modification, the set of rules it applied to modified numeric data entry, and the candidate matches identified by the application of the set of rules are displayed on the user interface.

* * * * *